United States Patent [19]
Ott

[11] Patent Number: 6,088,412
[45] Date of Patent: Jul. 11, 2000

[54] ELASTIC BUFFER TO INTERFACE DIGITAL SYSTEMS

[75] Inventor: Stephan Ott, Munich, Germany

[73] Assignee: VLSI Technology, Inc., San Jose, Calif.

[21] Appl. No.: 08/892,565

[22] Filed: Jul. 14, 1997

[51] Int. Cl.[7] ..................................................... H04L 7/00
[52] U.S. Cl. ........................... 375/372; 375/371; 375/354; 710/56
[58] Field of Search ..................................... 375/372, 371, 375/354; 710/56, 34; 709/233; 712/25

[56] References Cited

U.S. PATENT DOCUMENTS

| | | | |
|---|---|---|---|
| 5,602,882 | 2/1997 | Co et al. | 375/372 |
| 5,771,356 | 6/1998 | Leger et al. | 709/233 |
| 5,796,796 | 8/1998 | Wang | 375/372 |
| 5,864,714 | 1/1999 | Tal et al. | 710/56 |

*Primary Examiner*—Stephen Chin
*Assistant Examiner*—Shuwang Liu
*Attorney, Agent, or Firm*—Wagner Murabito & Hao LLP

[57] ABSTRACT

The present invention comprises an elastic buffer to interface digital systems and eliminate sample slippage. The system of the present invention includes a FIFO buffer, a signal classifier, and a FIFO manager. The FIFO buffer receives and stores a plurality of samples as they are received from a transmitting digital system. The plurality of samples comprise a received digital signal and are stored on a first in first out basis. The signal classifier is coupled to the FIFO buffer. The signal classifier is adapted to identify non-essential samples among the plurality of samples stored in the FIFO buffer. The FIFO manager is coupled to the FIFO buffer and the signal classifier. The FIFO manager is adapted to remove the non-essential samples identified by the signal classifier, or, insert additional non-essential samples into the plurality of samples stored within the FIFO buffer. When the FIFO buffer is in an underrunning condition, the additional non-essential samples are inserted. When the FIFO buffer is in an overrunnng condition, the non-essential samples are removed. Thus, non-essential samples are removed or inserted into the FIFO buffer such that the plurality of samples comprising the digital signals are output to a receiver at the receiver's sample rate, eliminating sample slippage.

22 Claims, 7 Drawing Sheets

ELASTIC BUFFER TO INTERFACE DIGITAL SYSTEMS

TECHNICAL FIELD

The present invention relates generally to digital information systems. More particularly, the present invention relates to a method and system for reducing signal distortions caused by asynchronous sample rates between digital information systems.

BACKGROUND ART

The transmission of digital information and data between systems has become an essential part of commonly used systems. With such systems, information content is transmitted and received in digital form as opposed to analog form. Information long associated with analog transmission techniques, for example, television, telephone, music, and other forms of audio and video, are now being transmitted and received digitally. The digital form of the information allows signal processing techniques not practical with analog signals. In most applications, the user has no perception of the digital nature of the information being received.

Traditional modes of communication often occurred in "real time". For example, a telephone conversation occurred in real time. A "live" video conference occurred in real time. Users have come to expect these, and other such traditional forms of communication to be real time. Thus, digital transmission and reception techniques and systems need to provide for the real time transmission and reception of information.

There is a problem, however, in that digital communication between devices distant from each other usually precludes the availability of identical sampling frequencies. Except for those cases where a distinct clocking hierarchy structure can be defined and a common distributed clock source employed, there will be some difference between the sample rate of one device (e.g., the transmitter) from the other (e.g., the receiver).

Prior Art FIG. 1 shows a typical prior art digital information transmission and reception system 100. In system 100, a signal source 101, for example, a voice transmitter for a telephone, generates an analog input signal. The input signal is coupled to a sampler-ADC (analog to digital converter) 102, where it is sampled and encoded into a digital signal. The digital signal is comprised of a series of samples, representative of the analog input signal. This digital signal is transmitted across a transmission link to a FIFO (first in first out) buffer 103. Buffer 103 is coupled to a receiver-DAC (digital to analog converter) reconstruction filter 104 (hereafter receiver 104). As the samples comprising the digital signal arrive at buffer 103, they are stored and subsequently output to receiver 104 on a first in first out basis. The "stream" of samples are subsequently coupled to the DAC-reconstruction filter included within receiver 104, where they are decoded and filtered into an analog output signal, for example, the user's voice. The output signal represents the input signal from signal source 101.

In system 100, as in other typical prior art digital transmission systems, the transmitter (e.g., sampler-ADC 102) and receiver 104 operate at different sampling clock frequencies. Additionally, the ratio between the sampling clock frequency of sampler-ADC 102 and the sampling clock frequency of receiver 104 usually is a non-integer value. Hence, even though information is being transmitted at the same nominal sampling frequency, when the local clocks are not the same, there will usually be a slight difference in the actual sampling rates. As a result, sampling at the sending terminal (e.g., sampler-ADC 102) and reconstruction at the receiving terminal (e.g., receiver 104) is accomplished with a slight variance from the nominal sampling rates.

In addition, the sample rate frequencies may also vary over temperature, part scattering, and time. For clock ratios with a fractional part, a sample rate exists at which sample overruns or underruns will occur in buffer 103 due to its fixed capacity. Those overruns and underruns are hereafter referred to as sample slippage. Sample slippage generates objectionable distortion, for example, in the form of an audible click noise in audio transmissions or telephony applications, and horizontal jitter in television systems. In some systems, the error due to slippage is cumulative and segments of transmitted information are backed-up and/or delayed. Over a period of time, such segments may eventually be lost, especially if the system is designed to re-synchronize, or attempt to re-synchronize, itself to a real time or master clock.

For example, where the sample rate of the receiver is slower than that of the transmitter, the many samples comprising the received digital signal eventually overrun buffer 103, forcing the receiver 104 to "throw away" an amount of samples in an attempt to re-synchronize itself. Where the sample rate of the receiver is faster than that of the transmitter, the samples comprising the received digital signal cause an underrun condition at buffer 103, forcing the receiver 104 temporarily pause operation in order to re-synchronize itself. In either case, the resulting output signal is distorted and noisy with respect to the input signal.

Thus, what is required is a system for digital transmission which overcomes sample slippage limitations. The required system should provide for digital transmission and reception systems which eliminate sample slippage distortions. Additionally, the required system should function transparently with respect to users of the system. The system of the present invention should not cause noticeable distortion as it operates to remove sample slippage. The present invention provides a novel solution to the above requirements.

DISCLOSURE OF THE INVENTION

The present invention provides a system for digital transmission which overcomes sample slippage limitations. The system of the present invention provides for digital transmission and reception systems which eliminate sample slippage distortions. The system of the present invention functions transparently with respect to users of the system. The present invention does not cause noticeable distortion as it operates to remove sample slippage.

In one embodiment, the present invention comprises an elastic buffer to interface digital systems and eliminate sample slippage. The system of the present invention includes a FIFO buffer, a signal classifier, and a FIFO manager. The FIFO buffer receives and stores a plurality of samples as they are received from a transmitting digital system. The plurality of samples comprise a received digital signal and are stored on a first in first out basis. The signal classifier is coupled to the FIFO buffer. The signal classifier is adapted to identify non-essential samples among the plurality of samples stored in the FIFO buffer, and classify them accordingly. The FIFO manager is coupled to the FIFO buffer and the signal classifier. The FIFO manager is adapted to remove the non-essential samples identified by the signal classifier, or, insert additional non-essential samples into the plurality of samples stored within the FIFO buffer. When the FIFO buffer is in an underrunning condition, the additional non-essential samples are inserted. When the FIFO buffer is in an overrunning condition, the non-essential samples are removed.

As samples are output from the FIFO buffer, the FIFO manager acts to maintain the FIFO buffer at a nominal capacity level (e.g., approximately 50% full). If the samples are arriving from the transmitter faster than the sample rate of a coupled digital receiver, the FIFO manager removes non-essential samples from the FIFO buffer to maintain the nominal level. If the samples are being output to the receiver at a faster rate than they are arriving from the transmitter, additional non-essential samples are added. Thus, non-essential samples are removed or inserted into the FIFO buffer such that the samples comprising the digital signal are output to a receiver at the receiver's sample rate, eliminating sample slippage. In addition, the non-essential samples are either inserted or removed at locations in the "sample stream" such that the operation of the present invention is transparent to the user.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

BEST MODE FOR CARRYING OUT THE INVENTION

Reference will now be made in detail to the preferred embodiments of the invention, an elastic buffer to interface digital systems, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention comprises an elastic buffer to interface digital systems. The present invention provides a system for digital transmission which overcomes sample slippage limitations. The system of the present invention provides for digital transmission and reception systems which eliminate sample slippage distortions. The system of the present invention functions transparently with respect to users of the system, and does not cause noticeable distortion as it operates to remove sample slippage. The present invention and its benefits are further described below.

Figure 1:
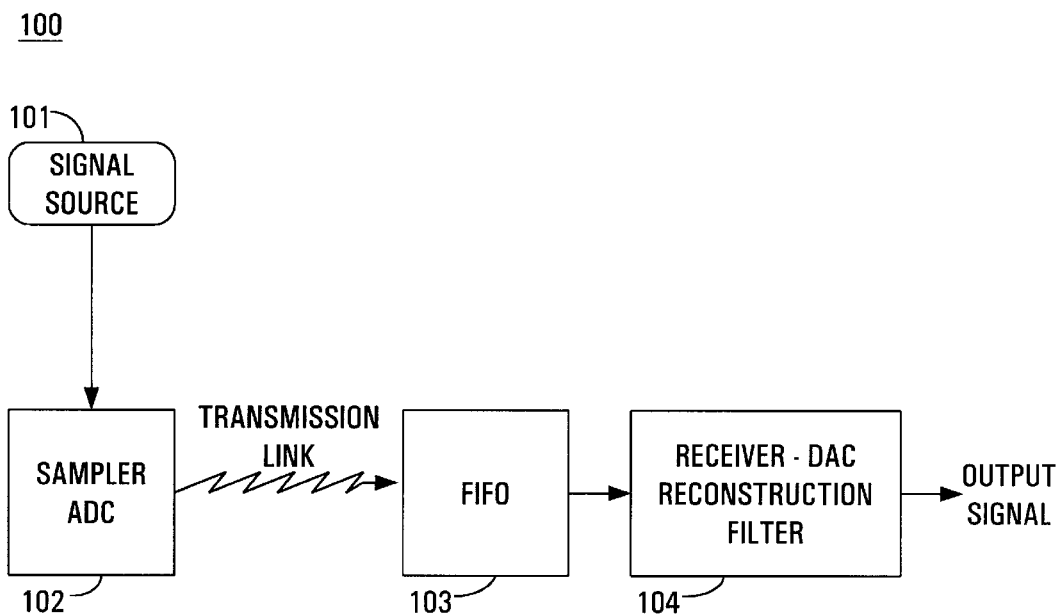
FIG. 1 shows a typical prior art digital transmission and reception system.
Figure 2:
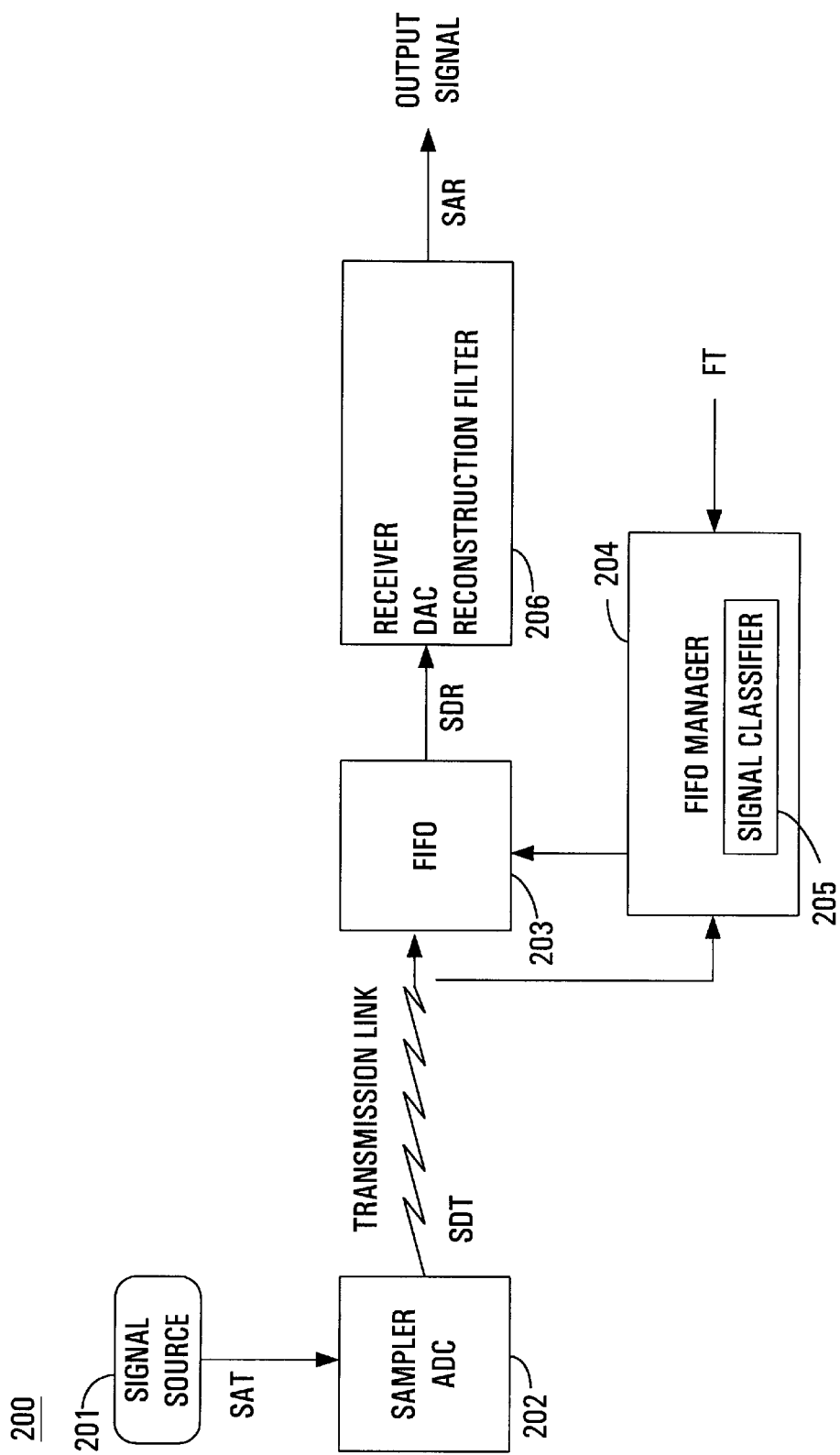
FIG. 2 shows a digital transmission and reception system in accordance with the present invention.

FIG. 2 shows a system 200 in accordance with one embodiment of the present invention. System 200 includes a signal source 201 coupled to a sampler ADC 202. The sampler ADC 202 is coupled via a transmission link to a FIFO 203 and a FIFO manager 204. Included within FIFO manager 204 is a signal classifier 205. The FIFO manager 204 is also coupled to FIFO 203. FIFO 203 is coupled to a receiver-DAC reconstruction filter 206. System 200 functions by accepting an analog signal from signal source 201, converting it to a digital signal, transmitting the digital signal over transmission link 203, and subsequently decoding and reconstructing the digital signal as an analog output signal, emerging from receiver-DAC reconstruction filter 206 (hereafter receiver 206).

In the present embodiment, signal source 201 comprises a real time voice signal source, for example, the voice microphone of a telephone, which captures a user's voice to be transmitted in real time to a distant listener. The analog signal emerging from signal source 201 is referred to as SAT (signal analog transmitted). SAT, being analog, is continuous in nature (e.g., not time discrete) and as such, has no sample rate to speak of. SAT is coupled to sampler ADC 202 as an input. The sampler ADC 202 functions by sampling SAT from signal source 201 into a digital pulse code modulated signal referred to as SDT (signal digital transmitted). SDT is subsequently transmitted through the transmission link. SDT, being digital, is time discrete and has a sample rate in accordance with the sample rate of sampler ADC 202. This sample rate is referred to as FT (sampling frequency transmitter).

The SDT signal is transmitted across the transmission link to FIFO 203. The signal SDT is a time discrete, digital representation of SAR, and is comprised of a series of samples. These samples arrive at FIFO 203 at a rate FT and are stored on a first in first out basis. As samples are received at the rate FT, samples are output from FIFO 203 to receiver 206 at the sample rate of FR (sampling frequency receiver). The samples output from FIFO 203 comprise the signal SDR (signal digital received). The samples of SDR are received by receiver 206, are decoded by the DAC, and filtered by the reconstruction filter to yield the analog output signal. The output signal is referred to as SAR (signal analog received) and is representative of the signal SAT.

FIFO manager 204 functions by managing the capacity of FIFO 203. FIFO 203, as with other prior art FIFO buffers, has a fixed capacity. In the present embodiment, the samples comprising SDT are stored in "N" storage locations, where FIFO 203 has a maximum capacity of N. FIFO manager 204 manages the contents of FIFO 203 such that its maximum capacity is not exceeded when the sample rate of receiver 206, FR, is slower than FT. FIFO manager 204 also manages the capacity of FIFO 203 such that it is not emptied when FR is faster than FT. FIFO manager provides for the controlled and constant flow of samples from FIFO 203 to receiver 206 at rate FR such that the output signal SAR is free from sample slippage distortion. In contrast, a prior art FIFO buffer would eventually fill to capacity and overrun if FT where faster than FR, or empty itself and underrun if FT where slower than FR, causing sample slippage distortion. System 200, however, eliminates sample slippage distortion in a manner transparent to both the user and the distant listener.

Referring still to FIG. 2, in a case, for example, where FIFO 203 is initially half full (e.g., 50%) and FT is equal to FR, samples are received and stored into FIFO 203 and output out of FIFO 203 at identical rates. The time for each sample to travel through FIFO 203 is N divided by 2, divided by FR. The level of FIFO 203 (hereafter the FIFO level) will remain 50% continuously, as system 200 functions. However, in a case, for example, where FR is not equal to FT, then a sample will be added to, or removed from, FIFO 203 at a rate (referred to as FS) equal to the absolute value of (FR−FT). Consequently, the FIFO level will deviate from 50% to either 0% or 100%, and after a time T=N/2/FS, FIFO 203 will be either full or empty, resulting in undesirable sample slippage. The present invention actively manages the FIFO level to prevent sample slippage.

The FIFO manager 204 tracks the FIFO level and actively manages the storage of the samples comprising SDT within FIFO 203. FIFO manager 204 manages the samples based upon their respective classifications assigned by signal classifier 205. As described above, FIFO manager 204 and signal classifier 205 are coupled to the transmission link conveying the samples of SDT. However, instead of storing the samples as with FIFO 203, signal classifier 205 classifies each of the samples according to their attributes. For example, signal classifier 205 classifies each of the samples according to the attribute "desired signal", "silence", "noise", "redundant" or the like. In such a scheme, the desired signal samples are considered essential samples and are of the highest priority. Silence, noise, redundant, and the like, are considered non-essential samples and are of lower priority.

Samples are labeled according to their respective classification from signal classifier 205. Using these classifications, FIFO manager 204 manages the FIFO level of FIFO 203 by discarding non-essential samples when FIFO 203 is in an overrunning condition and inserting samples when FIFO 203 is in an underrunmng condition. In so doing, the FIFO level of FIFO 203 remains relatively stable at a desired 50% level as the samples comprising SDT are output to receiver 206 at a constant rate (e.g., FR), thereby eliminating sample slippage. FIFO manager 204 inserts or removes samples in such a manner that its operation is transparent to the distant listener receiving the output signal SAR. This transparent method of operation is achieved by manipulating the non-essential samples of SDT.

Figure 3:
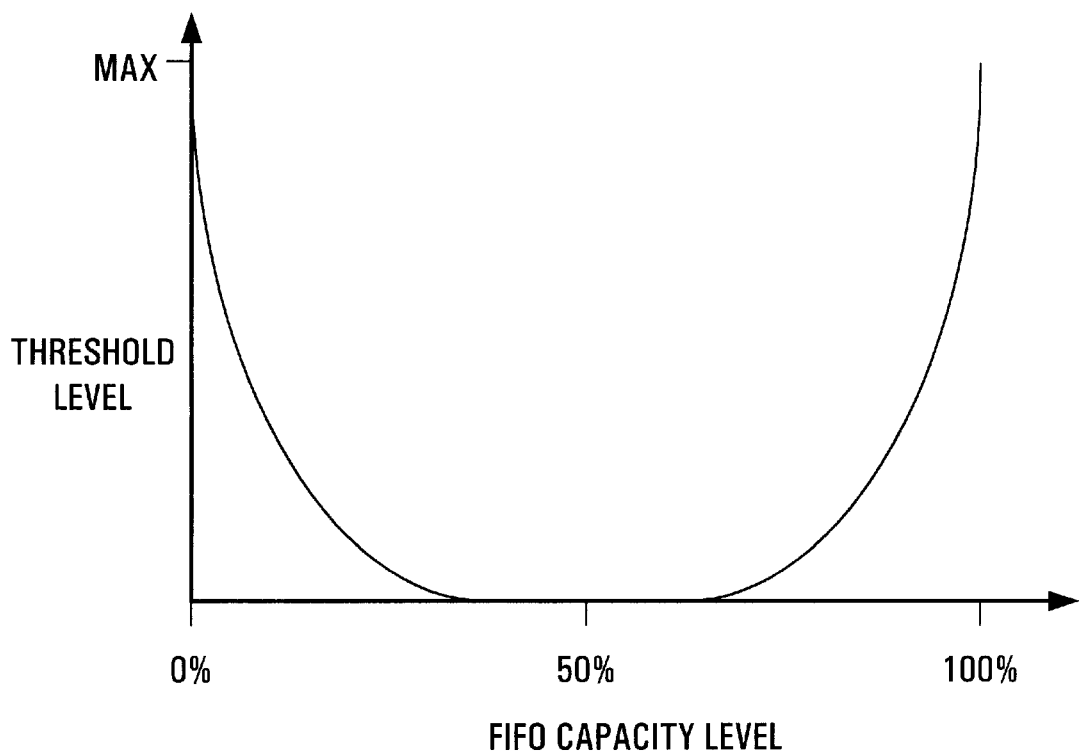
FIG. 3 shows a graph of the silence threshold level and the FIFO capacity level in accordance with one embodiment of the present invention.

Referring now to FIG. 3, a graph 300 of the silence threshold level and the FIFO capacity level is shown in accordance with one embodiment of the present invention. The vertical axis of graph 300 is the silence threshold level. The horizontal axis of graph 300 is the FIFO capacity level. For example, each time FIFO manager 203 encounters a span of samples which are not classified as desired signal by signal classifier 205, FIFO manager 204 adjusts the FIFO level to approach the desired 50% "watermark". The FIFO manager accomplishes this by removing or inserting silence or comfort noise samples to the stream of samples comprising SDT, stored in FIFO 203. If, for example, FIFO 203 is in an extreme overrunning condition, the signal classifier uses a more aggressive algorithm to detect non-essential samples. This is accomplished by raising the threshold for detecting samples representative of silence, for example. The larger number of silent non-essential samples are removed, bringing the FIFO level back to the desired 50% watermark. Hence, graph 300 shows a higher threshold level as FIFO capacity level approaches 0% (e.g., extreme underrun) or 100% (e.g., extreme overrun).

Thus, system 200, in accordance with the present invention, can maintain an arbitrarily long connection between the user and the distant listener provided signal SDT contains spans of removable non-essential samples (e.g., silence) from time to time. It should be noted that this is true for both television and voice signals and most audio signal sources. In accordance with the present invention, the capacity of FIFO 203 has to be chosen according to the statistics of the signal source and the frequency difference FS of transmitter and receiver.

For example, consider a digital phone conversation between two stations operating at a nominal rate of 8000 samples per second. The receiver sample rate may deviate by ±100 ppm ($10^{-4}$) from the nominal value. Assume a FIFO with a total capacity of 2000 samples and the watermark (also the initial signal delay) set to 1000 samples. A connection of approximately 21 minutes can be maintained without any management action being taken by a FIFO manager (e.g., FIFO manager 204). If only ⅛th second of silence can be accumulated during this connection, the FIFO level can already be kept at the desired 50% watermark level if the receiver is too slow. If the receiver is too fast, only a few samples of silence need be added every 21 minutes.

Figure 4:
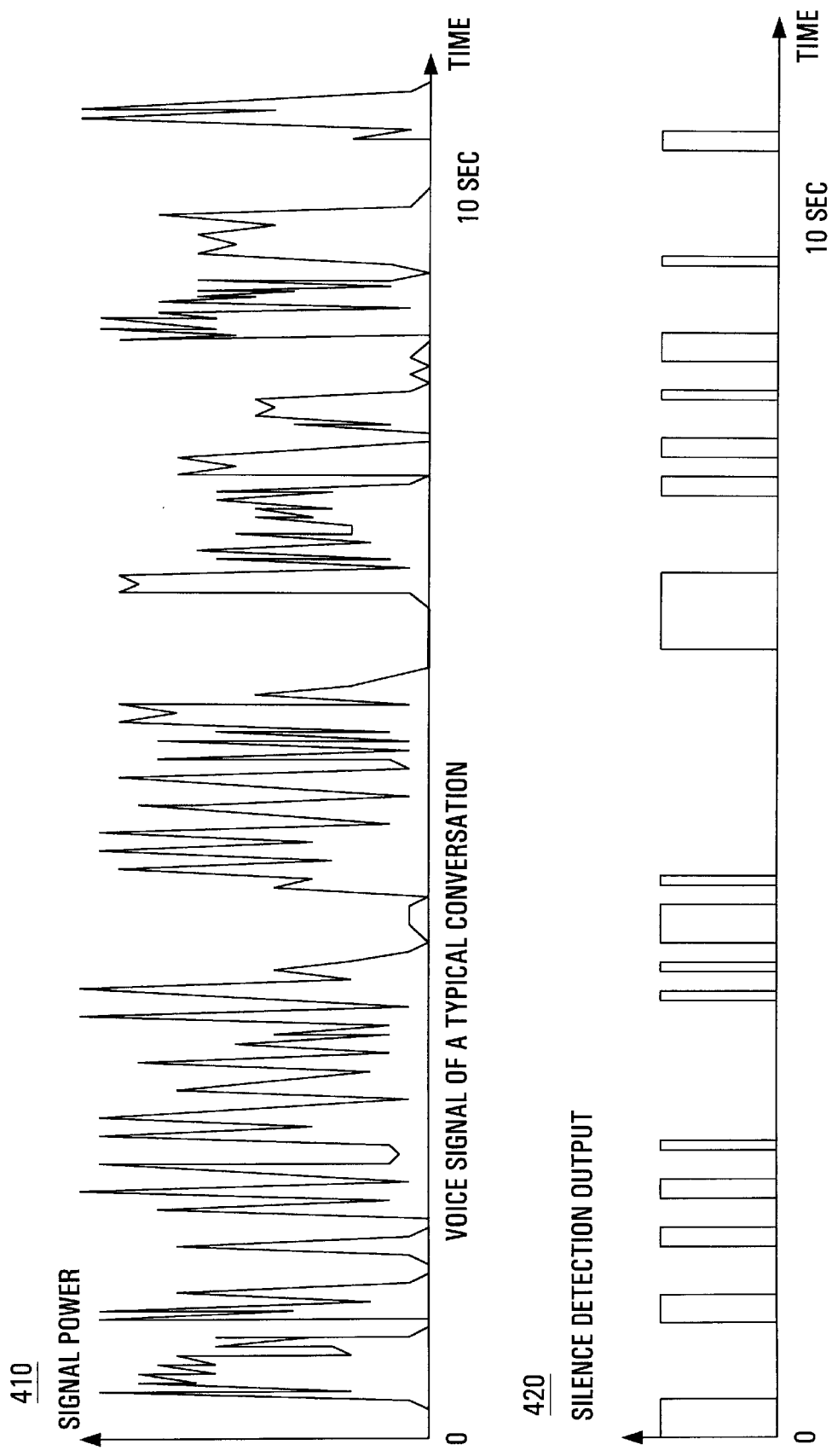
FIG. 4 shows a graph of a voice signal of a typical telephone conversation and a graph of the silence detection output of a signal classifier of the present invention.

Referring now to FIG. 4, a graph 410 of the voice signal of a typical conversation and a graph 420 of the resulting silence detection output of the signal classifier are shown. Graph 410 illustrates the wave form for 11 seconds of a typical phone conversation and the large share of silence it typically contains. All 11 seconds are quantitized into samples and are transmitted. The samples representative of silence can be used by the system of the present invention to correct the FIFO level to the desired 50% watermark, if needed. Graph 420 illustrates the silence detection output of the signal classifier (e.g., signal classifier 205). The silence detection output (active high) matches the silent periods of the voice signal shown in graph 410. Accordingly, where the threshold level used for silence detection is higher, the silence detection output will more aggressively indicate periods of silence in graph 410.

It should be noted that the FIFO capacity, and therefore the maximum delay at 100% FIFO level, usually has to be limited to the maximum signal delay that is permitted by the telephony system specification or other authorities. For the telephony application in the present example, a maximum delay of 250 ms is assumed.

Figure 5:
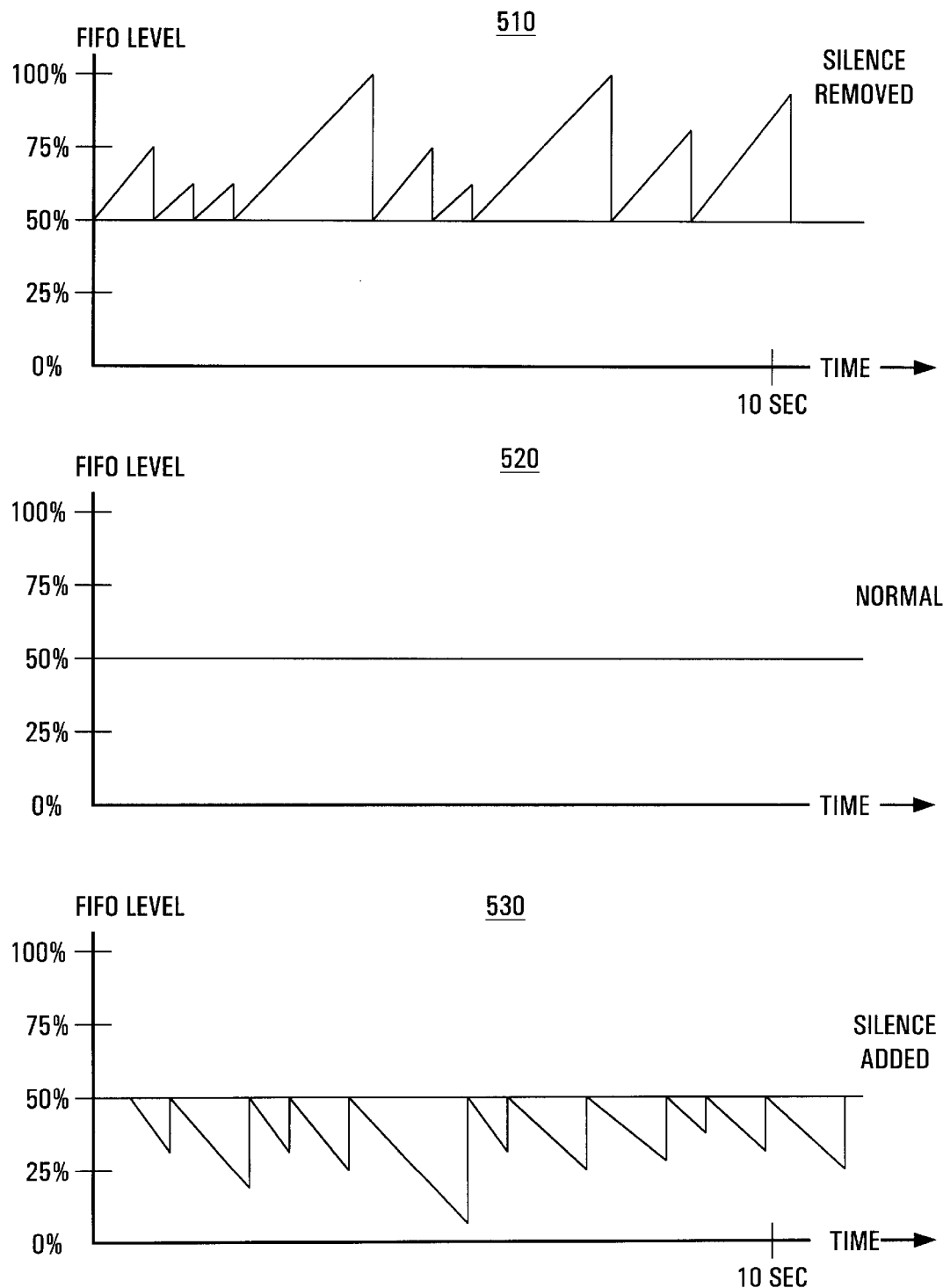
FIG. 5 shows a series of graphs showing the capacity level of the FIFO buffer of the present invention, with respect to the silence detection output, in differing situations.

Referring now to FIG. 5, a graph 510 showing the FIFO level as the FIFO manager 204 removes silent samples from a voice signal to correct the FIFO level back to 50%, a graph 520 showing the FIFO level where the sample rate of the receiver matches the sample rate of the transmitter, and a graph 530 showing the FIFO level as the FIFO manager 204 inserts silent samples to a voice signal to correct the FIFO level back to 50%. In graph 510, the FIFO level is continually being pushed toward 100% as FR is much slower that FT. As periods of silence are identified by signal classifier 205, the samples representative of the silence are removed, bringing the FIFO level back to 50%.

In graph 520, the FIFO level remains at 50% due to the fact that FR is equal to FT. In this case, FIFO manager 204 takes no action, allowing the samples to come and go through FIFO 203 at the FR rate. In graph 530, The FIFO level is continually being pushed toward 0% due to the fact that FR is much faster than FT. Hence, FIFO manager 204 adds additional samples of silence to the samples of silence preexisting within the voice signal to bring the FIFO level back to 50%. The additional samples of silence are added such that they add an additional amount of silence to the preexisting periods of silence detected by the signal classifier. In this manner, the additional samples are not noticed by the listener.

Figure 6:
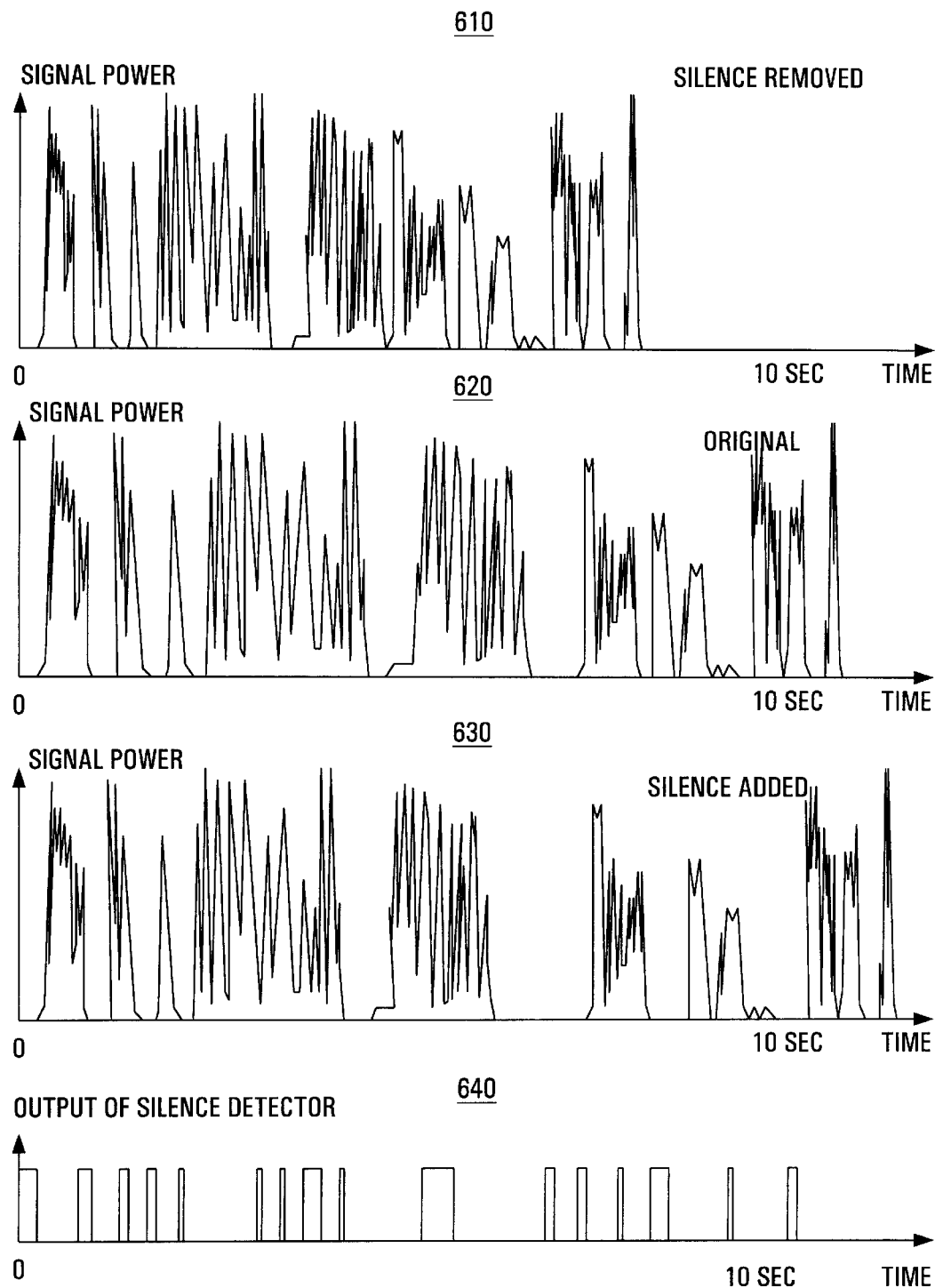
FIG. 6 shows a series of graphs of a voice signal processed by the system of the present invention with respect to a graph of the original voice signal and a graph of the silence detection output.

FIG. 6 shows graphs 610, 620, and 630 of a voice signal processed in accordance with the system of the present invention and graph 640 of the corresponding silence detection output of a signal classifier. Graph 610 shows the voice signal after periods of silence have been removed (e.g., samples representative of silence removed from SDT). Where the original signal was 11 seconds in length, the processed signal shown in graph 610 is 9 seconds in length.

In comparison, graph 620 shows the original unmodified voice signal. Graph 630 shows a processed signal having additional silence added (e.g., samples representative of silence added to SDT). Where the original signal was 11 seconds, the processed signal of graph 630 is 13 seconds in length. Graph 640 shows the silence detection output of a signal classifier (e.g., signal classifier 205 from FIG. 2). The periods of silence detected by the signal classifier correspond to the periods of silence shown in the voice signal shown in graph 620. Graph 610 shows these periods removed, while graph 630 shows these periods expanded. The essential portions of the voice signal, however, remain unaltered. In this manner, the present invention functions transparently with respect to users.

Figure 7:
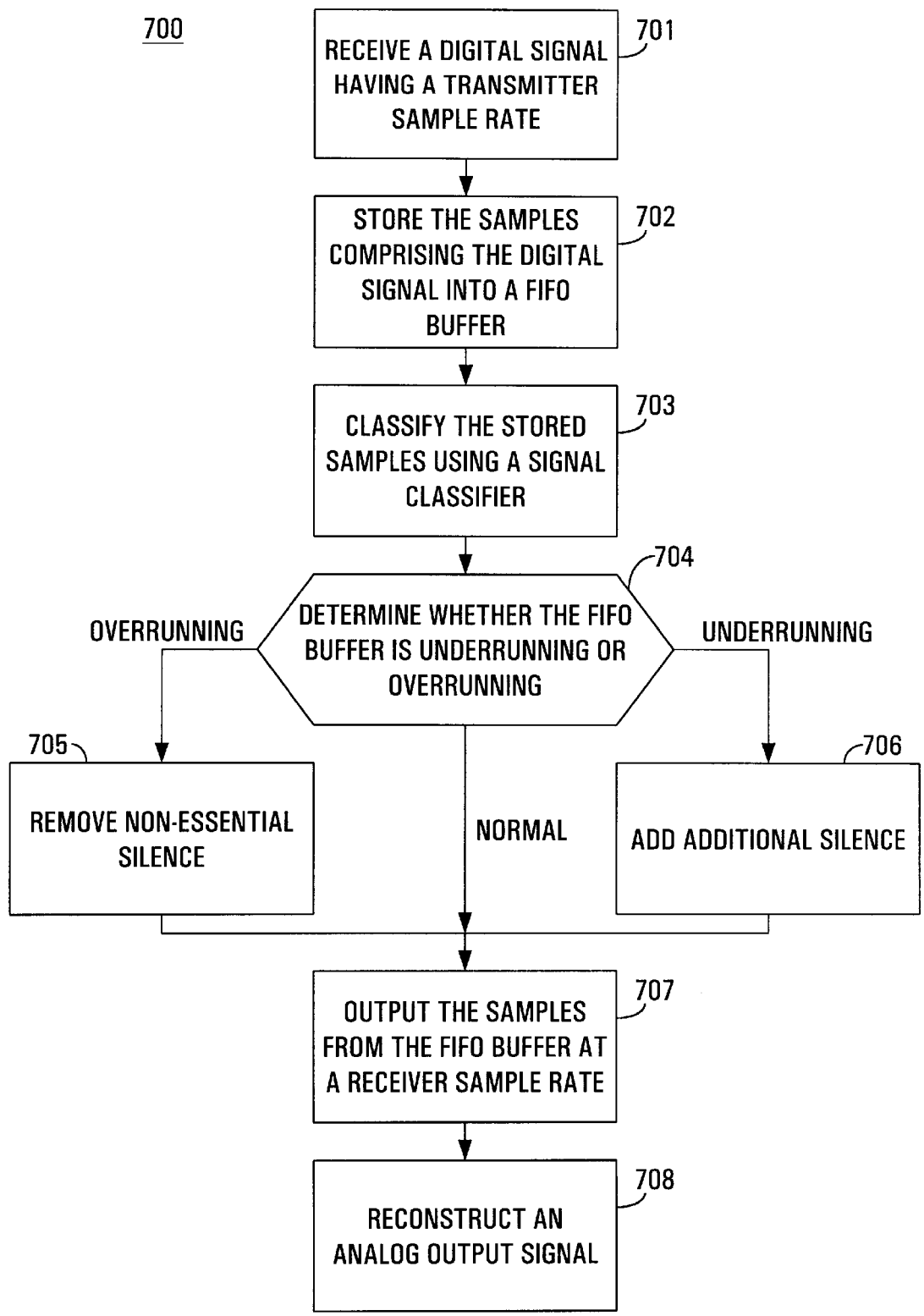
FIG. 7 shows a flow chart of the steps of a process in accordance with one embodiment of the present invention.

With reference now to FIG. 7, a flow chart of the steps of a process 700 in accordance with one embodiment of the present invention is shown. Process 700 begins with step 701, where a digital signal having a transmitter sample rate is received. The digital signal is a discrete, quantitized version of an analog input signal (e.g., a voice signal) from a signal source. The digital signal thus has a sample rate in accordance with the transmitter which sent it. The samples comprising the digital signal are received by a FIFO buffer (e.g., FIFO 203).

In step 702, the samples comprising the digital signal are stored into the FIFO buffer. The FIFO buffer, as described above, has a capacity of N samples. The samples comprising the digital signal are stored until the FIFO buffer is at a capacity of 50%. After this time, the samples are output at the sample rate of a coupled receiver (e.g., receiver 206) on a first in first out basis.

In step 703, the samples stored within the FIFO buffer are classified by a signal classifier included in the system of the present invention. The signal classifier (e.g., signal classifier 205) functions by discriminating between essential and non-essential samples. In the present embodiment, the signal classifier locates and labels non-essential samples comprising periods of silence within the digital signal. As described above, the signal classifier is adjustable, having a variable threshold for selecting silence, or other types of non-essential samples.

In step 704, the process of the present invention determines whether the FIFO buffer is underrunning or overrunning. If the FIFO buffer is overrunning, process 700 proceeds to step 705. If the FIFO buffer is underrunning, process 700 proceeds to step 706. If the FIFO buffer remains approximately at the desired 50% watermark level, process 700 proceeds directly to step 707.

In step 705, where the FIFO buffer is overrunning, a FIFO manager (e.g., FIFO manager 204) removes non-essential samples representative of silence, as previously identified by the signal classifier. This moves the FIFO level back toward the desired 50% watermark. Essential samples stored in the FIFO buffer remain unchanged.

In step 706, where the FIFO buffer is underrunning, the FIFO manager adds additional samples representative of silence to the FIFO buffer. The additional silence is added to the preexistent silence identified by the signal classifier. As described above, this has the effect of making the preexisting periods of silence in the voice signal slightly longer. By adding additional silence, the FIFO manager moves the FIFO level back toward the desired 50% watermark.

In step 707, the samples stored within the FIFO buffer are output to the coupled receiver at the sample rate of the receiver. The samples comprising the digital signal are output at the sampling rate of the receiver, thereby eliminating any sample slippage. Differences in the sample rates of the transmitter and the receiver are handled by the FIFO buffer in conjunction with the FIFO manager and the signal classifier. Where the sample rate of the transmitter and the sample rate of the receiver are the same, the samples are output from the FIFO buffer unchanged (e.g., no removed or additional samples). In this manner, FIFO buffer 203 functions as an elastic buffer, stretching above 50% capacity for brief periods when the transmitter sample rate is faster than the receiver sample rate and stretching below 50% when the transmitter sample rate is slower than the receiver sample rate. The samples output from the FIFO buffer are received by a coupled receiver (e.g., receiver 206).

In step 708, the system of the present invention reconstructs an analog output signal representative of the analog input signal. The samples from the FIFO buffer are converted from digital to analog by a DAC within the receiver which is subsequently filtered by a reconstruction filter also included within the receiver. The filtering removes unwanted higher frequency components of the analog signal. The resulting signal emerges from the receiver as the analog output signal. This analog output signal is free from sample slippage distortion and is indistinguishable from the analog input signal by the users of the system. In this manner, the system of the present invention functions transparently, unnoticed by the users.

Thus, the present invention provides a system for digital transmission which overcomes sample slippage limitations. The system of the present invention provides for digital transmission and reception systems which eliminate sample slippage distortions. The system of the present invention functions transparently with respect to users of the system. The present invention does not cause noticeable distortion as it operates to remove sample slippage.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for transmitting and receiving a digital signal while eliminating sample rate slippage, comprising:

a buffer for receiving and storing a plurality of samples comprising a received digital signal, said samples stored within said buffer on a FIFO (first in first out) basis, said digital signal received from a transmitting system;

a signal classifier coupled to said buffer, said signal classifier adapted to classify said plurality of samples to identify non-essential samples among said plurality of samples; and a FIFO manager coupled to said buffer and said signal classifier, said FIFO manager adapted to remove said non-essential samples from said plurality of samples or insert additional non-essential samples into said plurality of samples, said additional non-essential samples inserted when said buffer is in an underrunning condition, said non-essential samples removed when said buffer is in an overrunning condition, such that said plurality of samples are output from said buffer at a receiver sample rate without sample slippage.

2. The system of claim 1, wherein said buffer is a FIFO buffer having a capacity of N samples.

3. The system of claim 2, wherein said overrunning condition overrunning condition is when said FIFO buffer is filled to greater than a nominal capacity.

4. The system of claim 3, wherein said underrunning condition is when said FIFO buffer is filled to less than a nominal capacity.

5. The system of claim 4, wherein said nominal capacity is approximately 50% of N samples.

6. The system of claim 1, wherein said non-essential samples are samples representative of silence.

7. The system of claim 1, wherein said signal classifier includes an adjustable threshold level for detecting said non-essential samples.

8. The system of claim 7, wherein said adjustable threshold is adjusted depending upon a capacity level of said buffer.

9. The system of claim 1, wherein said signal classifier identifies said non-essential samples from the power level of said plurality of samples.

10. The system of claim 1 wherein said FIFO manager removes said non-essential samples or adds said additional non-essential samples to return said buffer to a nominal capacity.

11. An elastic buffer to interface digital systems and eliminate sample rate slippage, comprising:

a sampler circuit adapted to convert an analog input signal into a first digital signal, said sampler circuit using a sampling rate for conversion;

a buffer for receiving and storing a plurality of samples comprising said first digital signal, said samples stored within said buffer on a FIFO (first in first out) basis;

a signal classifier coupled to said buffer, said signal classifier adapted to classify said plurality of samples to identify non-essential samples among said plurality of samples;

a FIFO manager coupled to said buffer and said signal classifier, said FIFO manager adapted to remove said non-essential samples from said plurality of samples or insert additional non-essential samples into said plurality of samples, said additional non-essential samples inserted when said buffer is in an underrunning condition, said non-essential samples removed when said buffer is in an overrunning condition, such that said plurality of samples are output from said buffer at a receiver sample rate without sample slippage, forming a second digital signal; and a receiver operating at said receiver sample rate, said receiver coupled to receive said second digital signal and generate an analog output signal therefrom.

12. The elastic buffer of claim 11 wherein said receiver includes a digital to analog converter to convert said second digital signal and a filter to reconstruct said analog output signal.

13. The elastic buffer of claim 11, wherein said overrunning condition is when said buffer is filled to greater than a nominal capacity.

14. The elastic buffer of claim 13, wherein said underrunning condition is when said buffer is filled to less than said nominal capacity.

15. The elastic buffer of claim 14, wherein said non-essential samples are samples representative of silence and said signal classifier includes an adjustable threshold for detecting said non-essential samples.

16. The elastic buffer of claim 15, wherein said adjustable threshold is adjusted depending upon a capacity level of said buffer, and wherein said FIFO manager removes said non-essential samples or adds said additional non-essential samples to return said buffer to said nominal capacity.

17. The elastic buffer of claim 16, wherein said signal classifier identifies said non-essential samples from the power level of said plurality of samples.

18. The elastic buffer of claim 17, wherein said nominal capacity is approximately 50% of a maximum capacity of said buffer.

19. In an elastic buffer to interface digital systems, a method of eliminating sample slippage, the method comprising the steps of:

a) receiving a digital signal having a transmitter sample rate;

b) storing a plurality of samples comprising said digital signal;

c) classifying said plurality of samples as to whether each of said plurality of samples is an essential sample or a non-essential sample;

d) determining whether a buffer storing said plurality of samples is overrunning or underrunning;

e) removing said non-essential samples when said buffer is overrunning;

f) adding additional non-essential samples when said buffer is underrunning;

g) outputting said plurality of samples in a first in first out manner at a receiver sample rate; and h) generating an analog output signal from said plurality of samples.

20. The method of claim 19 wherein step c) further includes classifying said plurality of samples wherein said non-essential samples are representative of silence in said digital signal.

21. The method of claim 20 further including the step of detecting said non-essential samples from their respective power levels.

22. The method of claim 21 further including the step of varying a threshold level for detecting said non-essential samples depending upon a capacity level of said buffer.

* * * * *